United States Patent [19]

Aulich et al.

[11] 4,213,672

[45] Jul. 22, 1980

[54] LIGHT WAVEGUIDE WITH A HIGH TENSILE STRENGTH

[75] Inventors: Hubert Aulich; Nikolaos Douklias, both of Munich; Heinz Hacker, Nurenberg; Guenter Zeidler, Unterpfaffenhofen, all of Fed. Rep. of Germany

[73] Assignee: Siemens Aktiengesellschaft, Berlin & Munich, Fed. Rep. of Germany

[21] Appl. No.: 917,782

[22] Filed: Jun. 22, 1978

[30] Foreign Application Priority Data

Jun. 30, 1977 [DE] Fed. Rep. of Germany ....... 2729648

[51] Int. Cl.² .................................................. G02B 5/14
[52] U.S. Cl. ............................... 350/96.23; 350/96.33; 350/96.34; 427/163; 428/378; 428/902
[58] Field of Search ............. 350/96.23, 96.30, 96.33, 350/96.34; 427/163, 164, 165, 169; 428/364, 375, 378, 902, 903

[56] References Cited

U.S. PATENT DOCUMENTS

| 3,980,390 | 9/1976 | Yamamoto et al. | 350/96.33 |
|---|---|---|---|
| 4,037,922 | 7/1977 | Claypoole | 350/96.23 |
| 4,056,651 | 11/1977 | Scola | 428/375 X |
| 4,072,400 | 2/1978 | Claypoole et al. | 350/96.33 X |
| 4,075,179 | 2/1978 | Karkoski et al. | 428/375 X |
| 4,098,926 | 7/1978 | Nöthe | 427/163 |
| 4,105,284 | 8/1978 | Olshansky | 350/96.33 |
| 4,113,349 | 9/1978 | Stiles | 350/96.33 X |
| 4,114,981 | 9/1978 | Ishida et al. | 350/96.33 |

FOREIGN PATENT DOCUMENTS

2513722  9/1976  Fed. Rep. of Germany ........ 350/96.23

*Primary Examiner*—John K. Corbin
*Assistant Examiner*—John D. Lee
*Attorney, Agent, or Firm*—Hill, Van Santen, Steadman, Chiara & Simpson

[57] ABSTRACT

A light waveguide with a high tensile strength including a light conducting or optical fiber being coated with a plastic coating to improve the tensile strength characterized by the plastic coating being a plastic lacquer applied directly on the surface of the light conducting fiber, being a high temperature stable material selected from a group consisting of polyurethanes, epoxides, polyesters, polyesterimides, polyimides, and polyvinyl dimethoxymethane, which material has a softening temperature of at least 150° C. The coating has a thickness of at least 2 μm and is uniformly concentrically applied over the entire length of the light conducting fiber without any surface defects. The light waveguide may include an outer covering which is either tightly applied or loosely applied onto the light conducting fiber and its coating. To improve movement of the light conducting fiber and its coating in the covering, a slide layer may be interposed between the outer covering and the plastic lacquer coating.

3 Claims, No Drawings

LIGHT WAVEGUIDE WITH A HIGH TENSILE STRENGTH

BACKGROUND OF THE INVENTION

1. Field of the Invention

The present invention is directed to a light waveguide such as a light waveguide cable of a high tensile strength in which optical fibers are provided with a plastic coating to increase the tensile strength. The light waveguide may be disposed in either a loose or a tight fitting outer jacket or covering.

2. Prior Art

Light waveguides using optical or light conducting fibers are being used instead of metal conducting wires because of the large transmission band width. Depending on the type of the use for the light conducting fibers, they are used in a cable with either a loose or tight fitting plastic covering or jacket. The loose jacket or covering provides a place for movement of the light conducting fiber, which prevents optical impairment due to micro bending. Tight fitting covers are especially used in applications which require special requirements, for example, with respect to water penetration. A light waveguide cable utilizing optical or light conducting fibers will require a tensile strength, which is as high as possible, due to conditions which prevail during manufacturing, during embedment and in certain cases during the service life of the cable.

It is already known to manufacture light conducting fibers, which have a diameter of 100–150 $\mu$m and which during manufacturing are cladded or covered with a plastic coating of several $\mu$m. This coating adds to the tensile strength of the fiber its own tensile strength and also protects the fiber from external damages. If there is very little or no affinity between the light conducting fiber and the plastic coating so that relative movement is possible, no mutual support of the tensile strength of either the coating or fiber will occur and such a coated fiber has an undesirable low tensile strength.

SUMMARY OF THE INVENTION

The present invention is directed to providing a light waveguide which has increased tensile strength due to optimum selection of the proper plastic materials which are used for coating the light conducting fibers of the waveguides. These objects or tasks are accomplished by an improvement in the light waveguide which includes a light conducting fiber being coated with a plastic coating to improve the tensile strength. The improvement comprises the plastic coating being a plastic lacquer applied directly onto the surface of the light conducting fiber, said plastic lacquer being a high temperature stable material selected from a group consisting of polyurethanes, epoxides, polyesters, polyesterimides, polyimides and polyvinyl dimethoxymethane, said materials having a softening temperature of at least 150° and the coating having a thickness of at least 2 $\mu$m and being uniformly concentrically applied over the entire length of the light conducting fiber without any surface defects. The light waveguide may include the light conducting fiber with the coating of the plastic lacquer being either loosely disposed in an outer covering or tightly disposed therein. The outer covering or jacket may have an inner liner of fluoropolymers, and may consist of a polymer comprising a phthalate.

In the light waveguide having a loose outer covering or jacket, improved relative movement between the optical fiber and the jacket or between adjacent optical fibers if more than one is disposed in the outer jacket, can be obtained by providing a slide layer on the plastic coating of the plastic lacquer. The slide layer is a high temperature stable material, which has a softening temperature of at least 150° C. This slide layer may be a fluorinated hydrocarbon selected from a group consisting of polytetrafluoroethane and polytetrafluoroethylene-perfluoropropylene. The slide layer may also be selected from a group consisting of talcum, graphite and molybdenum disulfide or may be selected from a group consisting of silicone oil and parafin oils or may be a lacquer layer containing compounds selected from a group consisting of talcum, graphite and molybdenum disulfide.

DESCRIPTION OF THE PREFERRED EMBODIMENTS

The principles of the present invention are particularly useful in a light waveguide having a good tensile strength and including at least one light conducting fiber which is coated with a plastic coating to improve the tensile strength. The light waveguides may have the coated light conducting fiber disposed in an outer covering or jacket which may loosely receive the light conducting fiber or fibers or may be tightly fitting thereon. The light conducting fiber has a core of optical material which is cladded with an optical material which has an index of refraction that is lower than the index of refraction of the core so that the core conducts the light by total internal reflection.

In accordance with the principles of the present invention, the  coating on each of the light conducting fiber is a plastic lacquer, which is applied directly on the surface of the light conducting fiber to be uniformly concentrically applied over the entire length without any surface defects. The plastic lacquer is of a high temperature stable material selected from a group consisting of polyurethanes, epoxides, polyesters, polyesterimides, polyimides, and polyvinyl dimethoxymethanes, which have a softening or flow temperature of at least 150° C. The coating has a thickness of at least 2 $\mu$m and preferably is in a range of 2 $\mu$m to 10 $\mu$m. The plastic lacquers of the above mentioned group of materials have a low viscosity and surface tension, which is advantageous for wetting the fiber surface. Therefore, a uniform concentric coating of the glass fiber can be accomplished over its entire length. It is of a special advantage that the polar molecular groups in the plastic lacquer develop a pronounced affinity towards the polar molecular groups of the glass surface. These adhesion forces, which are produced, prevent relative movement which has the result that the coated fiber has a tensile strength on all parts which is the sum of the tensile strengths of the two contributing materials. This is not the case when the lacquer is used on other materials, for example, metal due to the fact that the comparable molecular groups are not available in the metal. The lacquers can be quickly cured either by UV radiation or thermally so that even at a high velocity of applying the lacquer onto the optical fiber, a uniform smooth surface can be obtained. The temperature stability and the corrosion resistance against environmental conditions are good because the lacquers are practically completely cured which results in only minimum aging effects and, therefore, hardly and impairment of the high initial tensile strength of the light conducting fibers over a long period of time. The coatings of the plastic lacquers already protect the fibers during manufacturing from damage and compensate by filling in surface roughnesses which are already present and which are unavoidable imperfections such as mini cracks which cracks reduce the resistance of the fibers to breaking. In addition, mechanical stresses created during the shrinking of the lacquer layer on the glass fiber has the result of applying additional forces which will increase the tensile strength of the waveguide.

The coating can be accomplished in a dip process by means of felt pads or jets or can be accomplished with other techniques such as used in coating a thin wire. It is however a prerequisite for the chosen coating technique that a damage of the fiber surface is prevented and, therefore, a high value of tensile strength for the fiber is obtained. Of all the coating systems which were examined up to date, a lacquer comprising polyesterimide has proven to be especially suitable. In this technique, the light conducting fiber is pulled from a melt to form the fiber and then immediately passes through a coating apparatus, which contains a coating solution of polyesterimides in a mixture of cresol, phenol and xylene. This coating solution will contain up to 50% by weight of the polyesterimides.

According to another embodiment of the present invention, an additional layer can be applied over the plastic lacquer coat, which layer is stable at high temperatures and has a low coefficient of friction with a softening or flow point of 150° C. or higher. This layer with the low coefficient of friction is a sliding layer and is particularly useful when one or more of the optical fibers with the coating of the plastic lacquer are disposed in a loose fitting covering or jacket. It should be noted that the high bonding or binding affinity of the polar groups of the plastic lacquer of the coating with regard to the polar groups of the fiber surface also has a similar binding affinity towards other materials which possess similar polar groups. Therefore, different areas or locations of the optical fiber are in danger of sticking to the loose plastic covering even during manufacturing. This might cause considerable variation in the thickness of the waveguide and can strongly impair the quality of the fiber optical cable or even render it useless. Also during storage, it is possible that due to the high frictional forces of the plastic lacquer, the fiber may stick to the outer plastic covering or jacket so that flexibility of the cable is lost during a following installation of the cable. In addition, the sticking of the fiber to the outer covering or jacket may impair other required movements of the cable and therefore produce undesirable stresses and optical losses. On the other hand, due to the great molecular affinity of the plastic lacquers, they have a very high coefficient of friction such that even without sticking to the loose outer covering or jacket during movement of the cable, undesirable mechanical stresses due to the frictional engagement between the fiber with the coating and the outer covering are initiated and result in optical losses which are noticed and which immediately reduce the tensile strength of the cable. Even the embodiment which has a tightly fitting jacket or covering, a solid adhesion of the outer jacket or covering is not desired because it would impair the flexibility of the cable and specifically during the process of stripping the outer jacket of the cable would lead to damage due to excessive forces being applied to the optical fibers. The low friction layer or sliding layer avoids any restriction in the material selected and prevents damages to the light waveguides and the optical fibers during a connection operation.

The low friction layer or slide layer may be formed of a fluorinated hydrocarbon selected from a group consisting of polytetrafluoroethane and polytetrafluoroethylene-perfluoropropylene. The fluorinated hydrocarbon is applied to the fiber after the application of the coating of the plastic lacquer, such as polyesterimide, to achieve an improved tensile strength but before an extrusion process to provide the outer jacket. Thus, the slide layer, which is a thin plastic layer with a very small coefficient of friction and a very high softening point, is applied between the coating and the jacket. In addition to the above mentioned advantages, the low coefficient of friction or slide layer, when formed of the fluorinated hydrocarbon, will have an additional feature of improving the tensile strength of the waveguide in a manner similar to the shrinking on of the coating of the plastic lacquer.

If the tensile strength requirements for the waveguide are not quite so great, other materials may be used for the slide layer. For example, the slide layer may be formed of powdered graphite, talcum or molybdenum disulfide. This slide layer can be easily applied by a spraying techinque before the extrusion process for applying the outer covering or jacket. It is also possible to apply a layer of plastic lacquer, which already contains compounds selected from a group consisting of the powdered graphite, talcum or molybdenum disulfide. Such a lacquer, which contains these materials, will form a very uniform layer. Another material, which may be used to form the slide layer which has a low coefficient of friction, is formed by using inert oils of a high viscosity and particularly oils selected from a group consisting of parafin oils and silicone oils.

The same advantage, which was obtained by utilizing a slide layer between the coating of the plastic lacquer and the outer jacket or covering whether it is a loosely or tightly adhering jacket, can be obtained by providing a soft cladding layer on top of the coating of the plastic lacquer. The soft cladding layer will normally consist of a silicone rubber or a polyurethane rubber which offers the fiber some type of resilient cushion against loads to prevent the transfer of force to the coated fiber during the stripping of the outer jacket or covering from the waveguide.

In order to improve the mobility of the coated fiber, the loose outer coating or jacket can have an inner lining of a fluoropolymer which has especially good low friction properties.

A practical example of an outer covering would be a covering or jacket which is formed of phthalate and particularly phthalic ester. Such a material has a good tensile strength, a high modulus of elasticity and has especially good extrusion properties.

An example of a preferred embodiment of a light waveguide in accordance with the present invention has the following dimensions. A light conducting fiber having a thickness or diameter of 100–150 $\mu$m, which is covered by a layer or coating of polyesterimide having a thickness in the range of 2–10 $\mu$m. The layer of polyesterimide is in turn covered or coated with a slide layer of a thickness of 0.5–5 $\mu$m of polytetrafluoroethylene-perfluoropropylene. This type of light waveguide is especially strong and simultaneously very flexible and the coating is very resistant to mechanical and chemical effects.

Although various minor modifications may be suggested by those versed in the art, it should be understood that we wish to embody within the scope of the patent warranted hereon, all such modifications as reasonably and properly come within the scope of our contribution to the art.

We claim:

1. In a light waveguide having a good tensile strength including a light conducting fiber being coated with a plastic coating to improve the tensile strength, the improvement comprising said plastic coating having a thickness of at least 2 μm and being uniformly concentrically applied directly onto the surface over the entire length of the light conducting fiber without any surface defects, said plastic coating being a high temperature stable material having a softening temperature of at least 150° C. and being a polyesterimide, and a slide layer being disposed on said coating, said slide layer being of polytetrafluoroethylene-perfluoropropylene.

2. In a light waveguide according to claim 1, wherein the light conducting fiber has a diameter of 100–150 μm, said coating having a thickness in a range of 2–10 μm and the slide layer having a thickness in the range of 0.5–5 μm.

3. In a light waveguide according to claim 1, which includes the light conducting fiber with the coating and said slide layer being loosely disposed in an outer covering.

* * * * *